United States Patent [19]
Lewis et al.

[11] Patent Number: 5,913,231
[45] Date of Patent: Jun. 15, 1999

[54] METHOD AND SYSTEM FOR HIGH SPEED MEMORY ADDRESS FORWARDING MECHANISM

[75] Inventors: Jerry Don Lewis, Round Rock; John Steven Dodson, Pflugerville; Ravi Kumar Arimilli, Austin, all of Tex.

[73] Assignee: International Business Machines Corporation, Armonk, N.Y.

[21] Appl. No.: 08/829,019

[22] Filed: Mar. 31, 1997

[51] Int. Cl.$^6$ ................................................. G06F 12/00
[52] U.S. Cl. ........................ 711/209; 711/201; 711/220; 711/3
[58] Field of Search ................................. 711/201, 209, 711/220, 3

[56] References Cited

U.S. PATENT DOCUMENTS

| | | | |
|---|---|---|---|
| 4,991,082 | 2/1991 | Yoshizawa et al. | 711/209 |
| 5,345,573 | 9/1994 | Bowden, III et al. | 711/217 |
| 5,423,086 | 6/1995 | Cannon et al. | 455/186.1 |
| 5,666,510 | 9/1997 | Mitsuishi et al. | 711/220 |
| 5,687,344 | 11/1997 | Mitsuishi et al. | 711/220 |

*Primary Examiner*—John W. Cabeca
*Assistant Examiner*—Mehdi Namazi
*Attorney, Agent, or Firm*—Sawyer & Associates; Casimer K. Salys

[57] ABSTRACT

A system and method for high speed memory address forwarding is presented. A method according to the present invention for high speed memory address forwarding for a processing system, the processing system including at least one processor and at least one memory, the method comprises the steps of: saving a first address for a first data request from the at least one processor; providing a portion of a second address for a second data request from the at least one processor; determining if the first and second addresses are located on a common page of the at least one a memory; combining the portion of the second address with at least a portion of the first address to form a combined address, if the first and second addresses are located on the common page; and requesting data from the combined address of the common page.

19 Claims, 6 Drawing Sheets

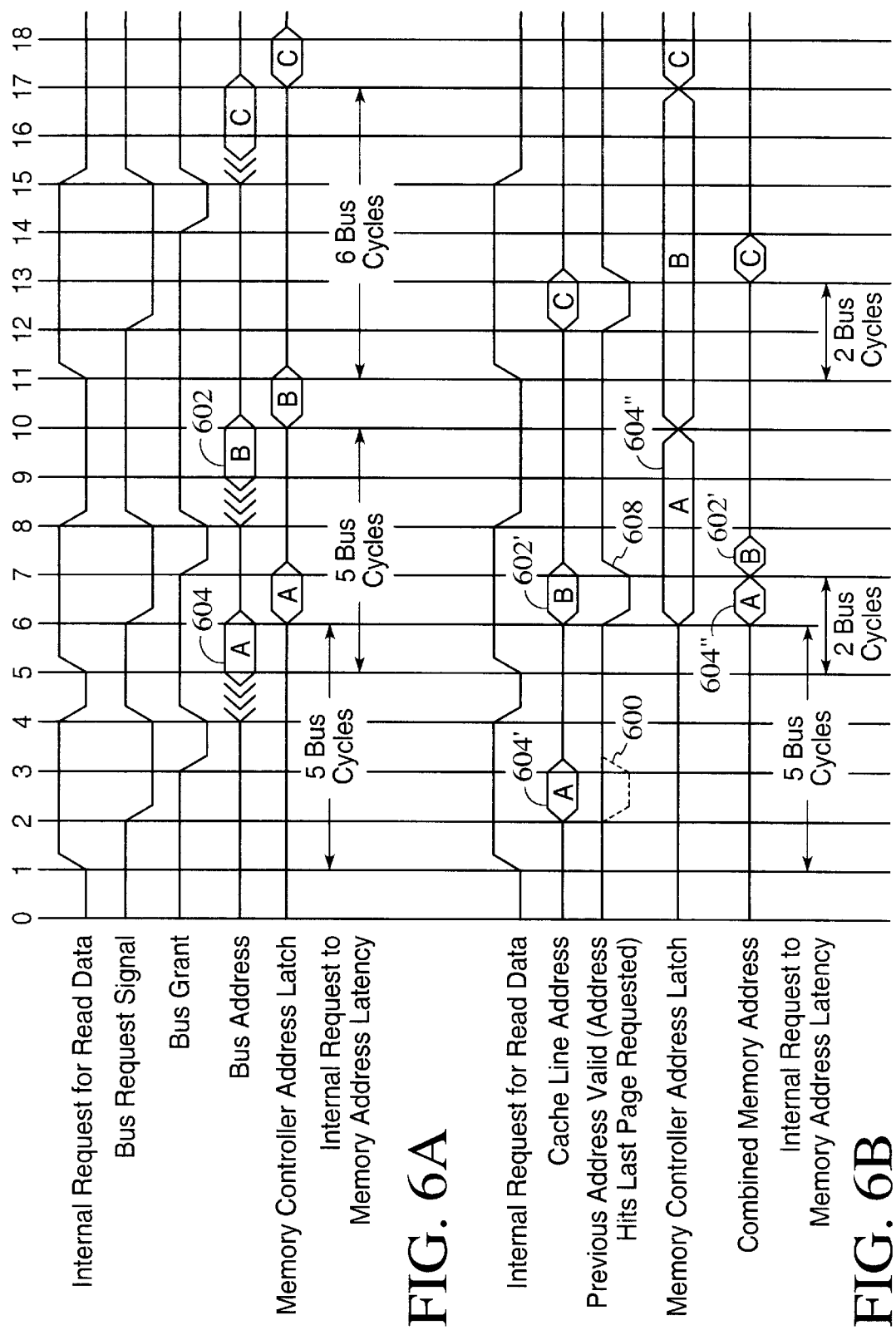

METHOD AND SYSTEM FOR HIGH SPEED MEMORY ADDRESS FORWARDING MECHANISM

FIELD OF THE INVENTION

The present invention relates to a system and method for a high speed memory address forwarding mechanism, and more particularly to a system and method for reducing memory read data latency and improving address throughput.

BACKGROUND OF THE INVENTION

Multiprocessor systems are now commonly used in environments such as businesses and research. When a processor in a multiprocessor system requests access to the memory, an arbiter is typically utilized to determine which data request is granted and in which order. These requests from the processors and grants from the arbiter are typically carried by the system bus.

In the conventional system, a minimum of five bus cycles are typically required between the time an internal request for data is generated within the processor, and the time which the address for the requested data is reached in the memory. The time required between the internal request and the address being reached in the memory controller is typically referred to as the internal request to memory address latency. It is common to require 13–16 bus cycles between the time a data request is generated within the processor or cache and the time which the data is retrieved. This time period is typically referred to as the read data latency.

What is needed is a system and method for reducing memory read data latency and improving address throughput. The present invention addresses such a need.

SUMMARY OF THE INVENTION

A system and method for high speed memory address forwarding is presented. A method according to the present invention for high speed memory address forwarding for a processing system, the processing system including at least one processor and at least one memory, the method comprises the steps of: saving a first address for a first data request from the at least one processor; providing a portion of a second address for a second data request from the at least one processor; determining if the first and second addresses are located on a common page of the at least one a memory; combining the portion of the second address with at least a portion of the first address to form a combined address, if the first and second addresses are located on the common page; and requesting data from the combined address of the common page.

BRIEF DESCRIPTION OF THE DRAWINGS

FIGS. 6A–6B are timing diagrams of the method according to the present invention.

DESCRIPTION OF THE INVENTION

The present invention relates to a high speed memory address forwarding mechanism. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
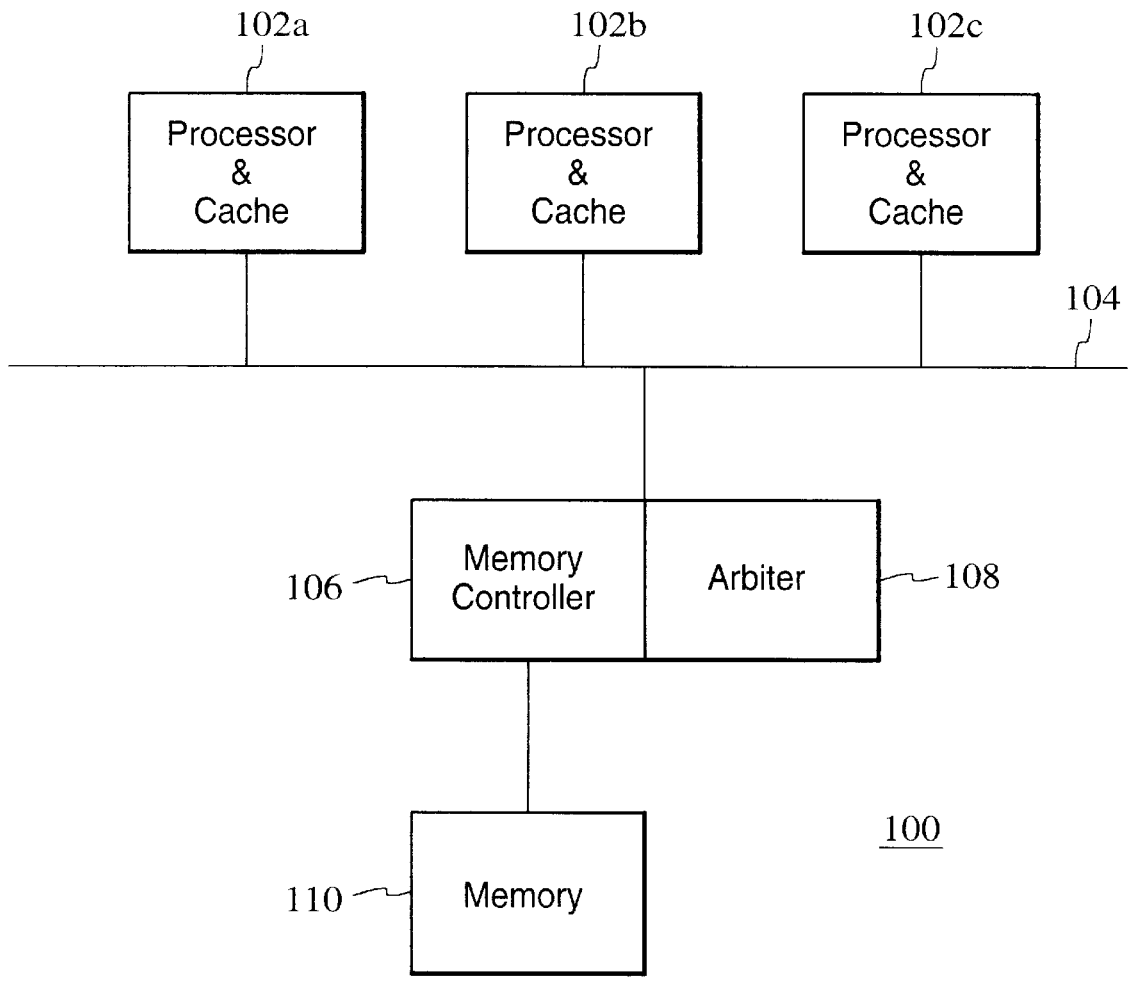
FIG. 1 is a block diagram of a multiprocessor system in which the present invention resides.

FIG. 1 is a block diagram of a multiprocessor system in which the present invention resides. The system 100 includes processors, each including a cache, hereinafter simply referred to as processors 102a–102c, a system bus 104, a memory controller 106, an arbiter 108, and a memory 110.

A computer system utilizing multiple processors 102a–102c is often configured with multiple bus masters, which may be processors 102a–102c, attached to the memory controller 106 via heavily-loaded address bus 104. Each bus master may be a single processor 102a–102c or a combination of processors 102 and caches that communicate to the memory controller 106 through a bus interface unit, sometimes referred to as the arbiter 108, that must arbitrate for memory resources. The arbiter 108 can be either internal or external to the memory controller 106.

Since bandwidth and latency directly affect the performance of this typical multiprocessor configuration, the bus 104 is usually run at the highest possible frequency with arbitration and control signals being sampled at the end of each bus cycle, while the heavily loaded address is sampled at the end of the second (or later) bus cycle.

Figure 2:
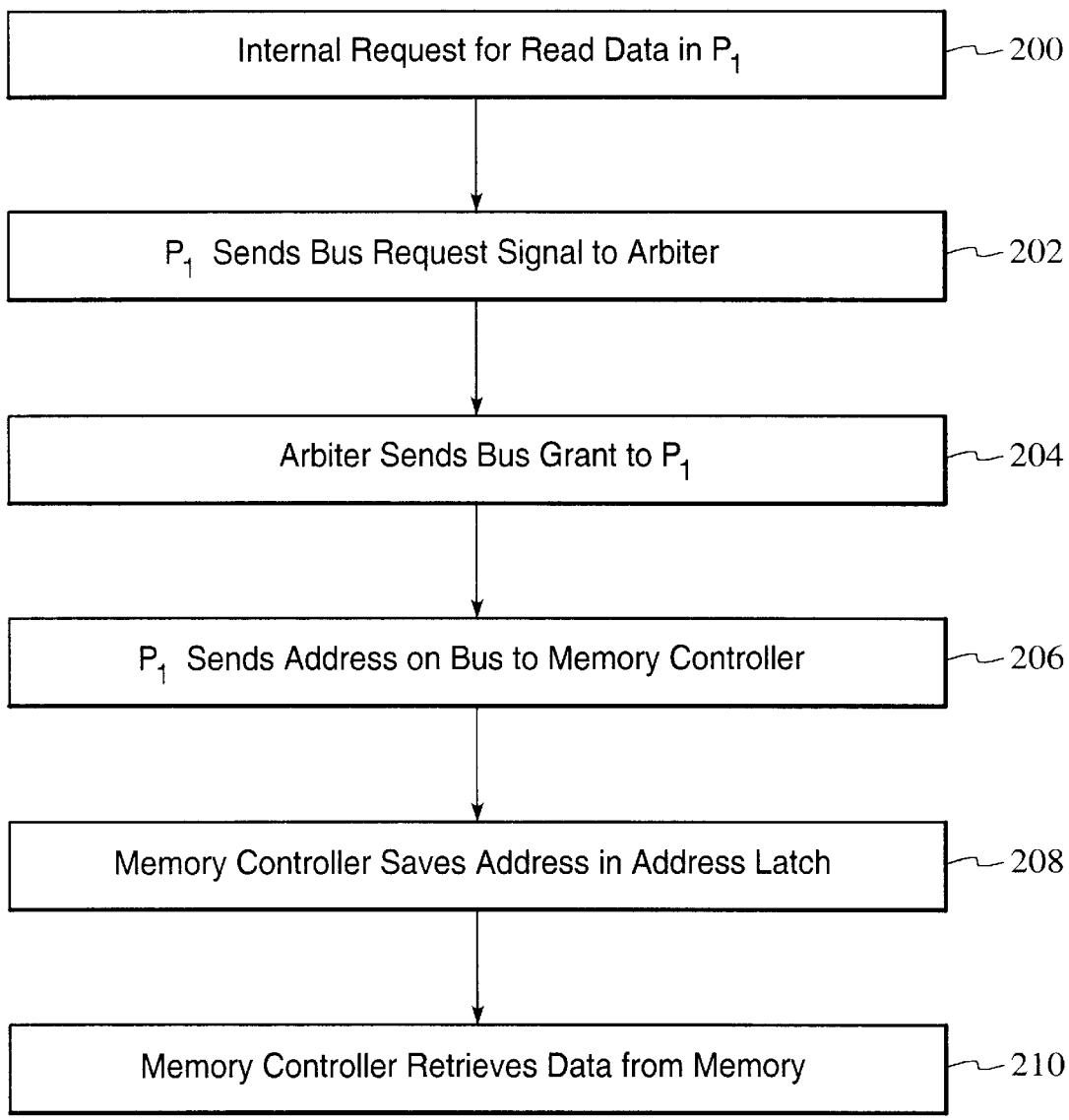
FIG. 2 is a flow diagram of a conventional method for memory address forwarding.

The system 100 as shown in FIG. 1 may be referred to when reviewing the flow diagram shown in FIG. 2. FIG. 2 is a flow diagram of a conventional method for memory address forwarding. First, an internal request for read data is recognized within one of the processors 102, such as processor 102a, via step 200. The processor 102a then sends a bus request signal to the arbiter 108 via step 202. Once the arbiter 108 determines that the requesting processor 102a may access the memory 110, then the arbiter 108 sends a bus grant signal to processor 102a via step 204.

Processor 102a can then send the requested address on the bus 104 to the memory controller 106 via step 206. The memory controller 106 saves the requested address in an address latch via step 208. In the conventional system, the memory controller 106 may simply have only one address latch for use with all of the processors 102a–102c. The memory controller 106 then retrieves the requested data from the memory 110 via step 210.

Figure 3:
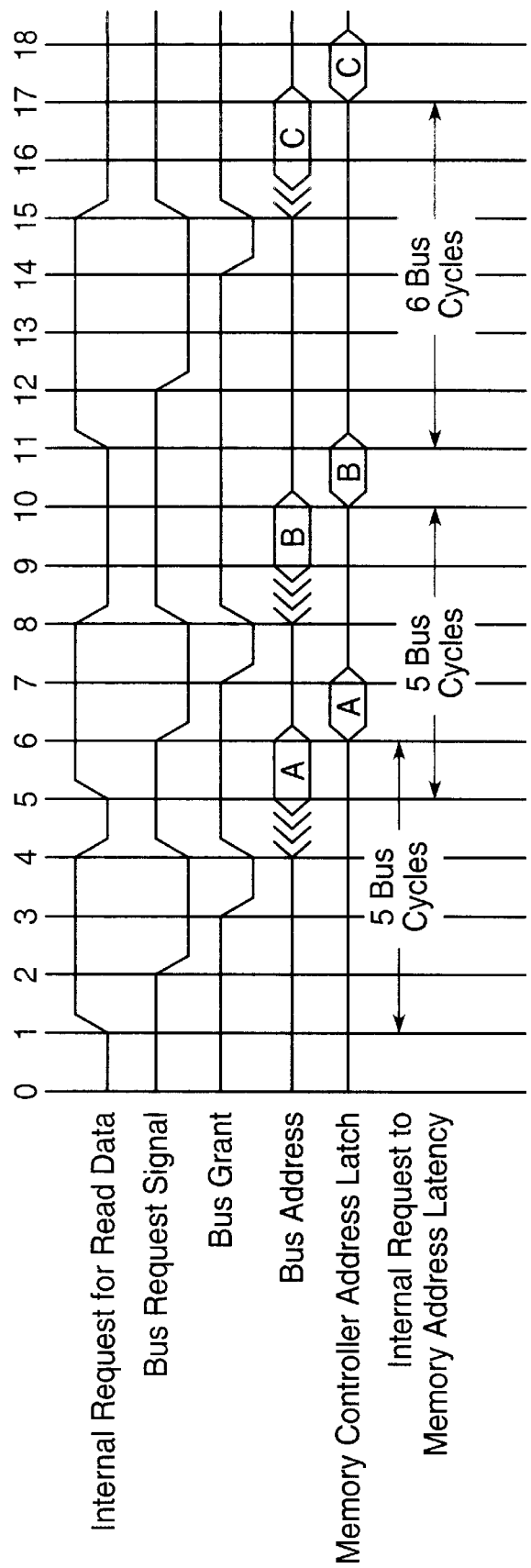
FIG. 3 is a timing diagram of the conventional method described in FIG. 2.

The flow diagram of the conventional method shown in FIG. 2 can be referred to in conjunction with the signal diagram of the conventional method, shown in FIG. 3. The signal diagram of FIG. 3 shows the minimum number of cycles required to complete each phase. As shown in FIG. 3, the internal request for read data takes one cycle, while the bus request signal typically takes another cycle. The bus grant signal given by the arbiter requires a minimum of another cycle, but can often require multiple cycles. The initiation of sending the requested address on the bus to the memory controller takes a minimum of another cycle, and may take another full cycle to complete the sending of the address on the bus (indicated in FIG. 3 by "<<"). The saving of the address in the address latch of the memory controller takes a minimum of another cycle. Thus, a minimum of five bus cycles are typically required from the time an internal request for read data is generated to the time when the memory controller saves the address in its address latch.

Similarly, the next request for read data also typically requires a minimum of five cycles for the internal request to memory address latency.

The present invention is a system and method to reduce the memory read data latency by reducing the internal request to memory address latency from a minimum of five cycles to two cycles for any request from a bus master that hits on the same memory page as the previous request. There is a high probability of occurrence of a request from a bus master hitting on the same page as the previous request. Adding a point to point cache line address and a previous address valid signal from each bus master to the memory controller allows the controller to start fetching the data at least three cycles earlier than in conventional methods.

In the system and method according to the present invention, the memory controller holds the previous address until a new requested address from the same bus master arrives. If a previous address valid signal arrives next, then the page address from the first address is combined with the cache line of the second address and forwarded to memory before the second address appears on the address bus. The end result is that read data latency is reduced by at least three bus cycles each time a memory read address hits the previously accessed page.

Figure 4:
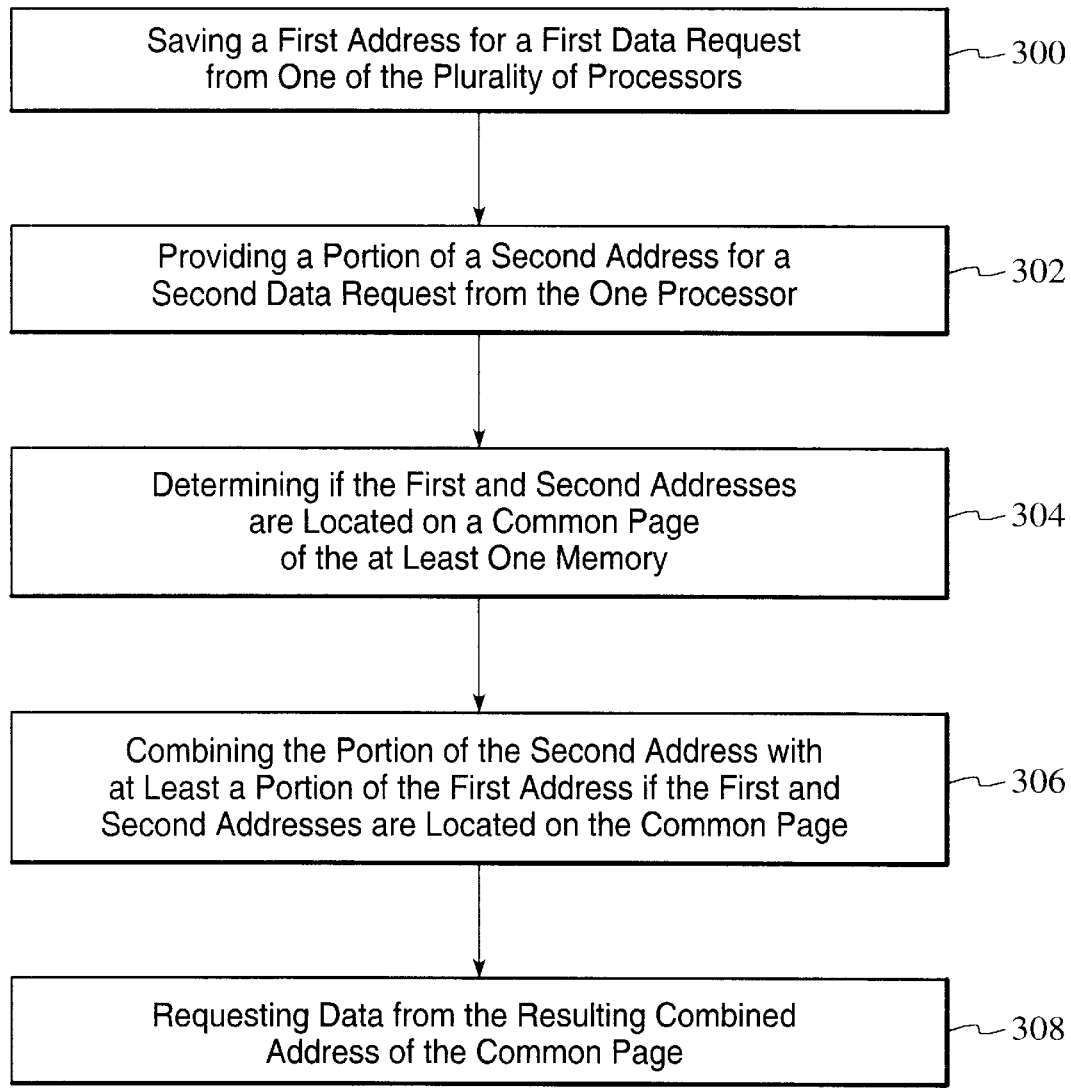
FIG. 4 is a flow diagram of a method according to the present invention for high speed memory address forwarding.

FIG. 4 is a simple flow diagram of a method according to the present invention for memory address forwarding. A first address for a first data request from one of the plurality of processors is saved via step 300. The first address is preferably stored in a latch reserved for requests from that particular requesting processor.

A portion of a second address for a second data request from the same processor is then provided via step 302. Preferably, the portion of the second address which is provided is a cache line address for the second request.

Next, it is determined if the first and second requested addresses are located on a common page of the memory via step 304. The portion of the second address is combined with at least a portion of the first address to form a combined address, if the first and second addresses are located on the common page, via step 306. Preferably, the cache line address of the second requested address is combined with the stored first requested address. Thus, the resulting combined address is preferably the first requested address with the first requested address' cache line address having been replaced by the second requested address' cache line address.

The data is then requested by using the resulting combined address of the common page via step 308.

Figure 5:
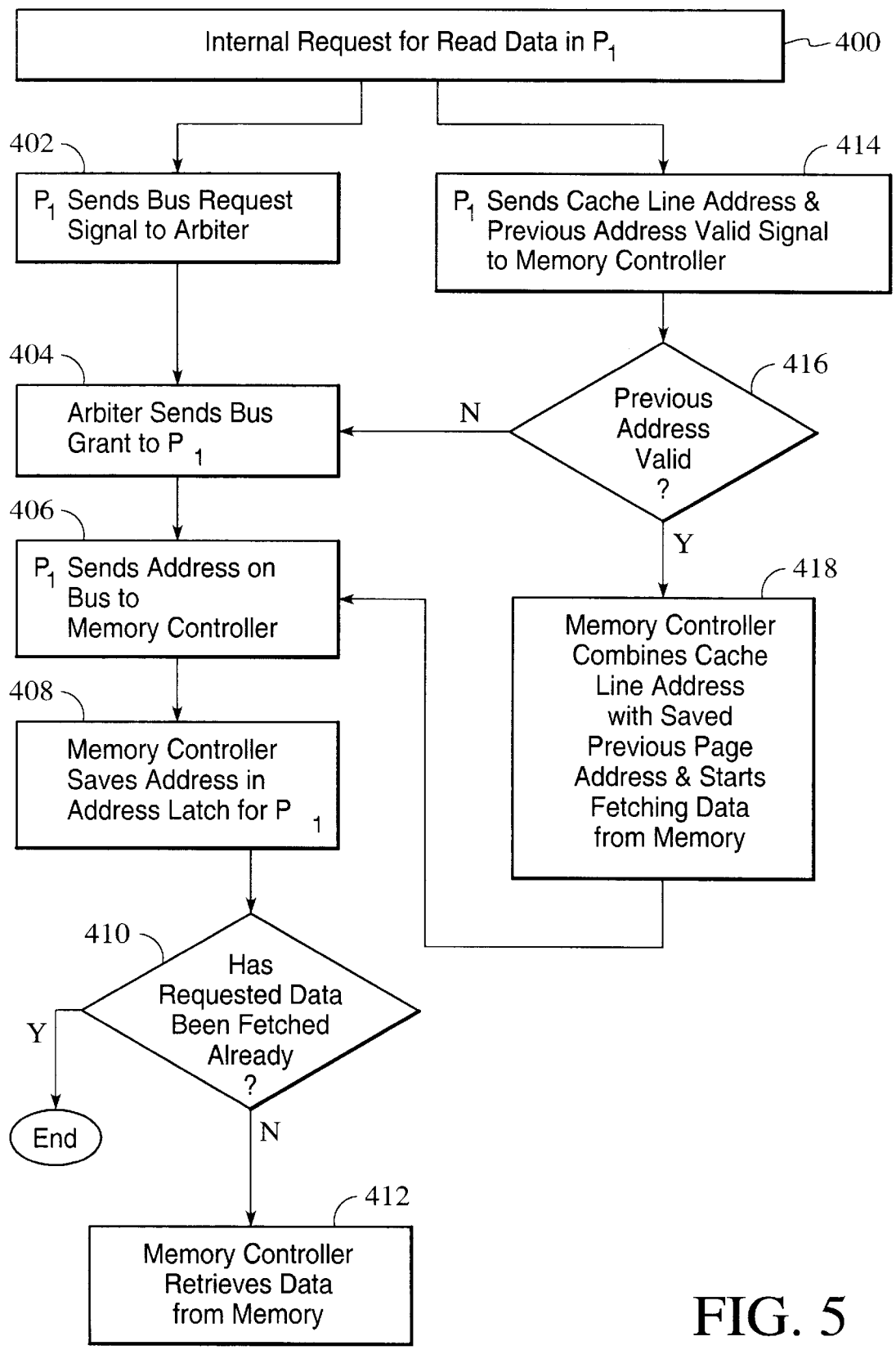
FIG. 5 is another flow diagram of a method according to the present invention for high speed memory address forwarding.

FIG. 5 is another flow diagram of a method according to the present invention for memory address forwarding. The flow diagram of FIG. 5 may be referenced in conjunction with the system 100 shown in FIG. 1.

First, an internal request for read data is generated in one of the processors, for example, 102c, via step 400. Processor 102c then sends a bus request signal to the arbiter 108 via step 402. The arbiter 108 sends a bus grant to processor 102c via step 404. The processor 102c sends the requested address on the bus 104 to the memory controller 106 via step 406.

The memory controller 106 then saves the address in an address latch reserved specifically for the requesting processor 102c via step 408. It is then determined if the requested data has already been fetched via step 410. If the requested data has already been fetched, then the memory address forwarding is complete. If, however, the requested data has not already been set, then the memory controller 106 retrieves the requested data from memory 110 via step 412.

Meanwhile, substantially simultaneous with sending the bus request to the arbiter 108 via step 402, processor 102c sends a cache line address of the requested address and a previous address valid signal to the memory controller 106 via step 414. The previous valid signal sent to the memory controller 106 by the requesting processor 102c indicates whether the current requested address and the previous address requested by the same processor are both located on the same page of the memory 110.

It is then determined if the previous address is valid via step 416. If the previous address is valid, then the currently requested address is located on the same page of memory 110 as the previous address. If the previous address is not valid, then the currently requested address is on a different page of the memory 110 than the previous address.

If the previous address is not valid, then the arbiter 108 continues to send the bus grant to the processor 102c via step 404. If, however, the previous address is valid, then the memory controller 106 combines the cache line address of the currently requested address sent by processor 102c with the previous page address which has been saved in a latch associated with processor 102c, via step 418. Additionally, the data fetching from the memory is initiated via step 418. Note that both sets of steps 402–412 and 414–418 are preferably executed.

FIGS. 6a–6b shows signal diagrams of the method of memory address forwarding according to the present invention. FIG. 6a shows the signal diagram corresponding to steps 400–412 of FIG. 5. FIG. 6b shows a signal diagram corresponding to steps 400 and 414–418 of FIG. 5.

In FIG. 6a, the internal request for read data takes one cycle and the bus request signal also takes one cycle. The bus grant signal is also shown to take a minimum of one cycle prior to its issuance. The initiation of the requesting processor 102c of sending the requested address on the bus to the memory controller takes a minimum of another cycle. It further takes another cycle prior to saving the requested address in the address latch reserved for the requesting processor 102c. The internal request to memory address latency for steps 400–412 of FIG. 5 remain at a minimum of five bus cycles, assuming that these steps are not terminated due to the requested data having been fetched via steps 414–418 of FIG. 5.

The signal diagram of FIG. 6b will normally take effect after the requesting processor 102c has already requested an address from the same page in the memory as the current requested address. Since the previous requested address is already saved in the address latch reserved for the requesting processor 102c, if the current requested address from the same processor 102c is located on the same page in memory as the previous requested address, then the two addresses are combined and the address is forwarded normally within two bus cycles rather than five bus cycles.

In FIG. 6b, the internal request for read data takes one cycle. The cache line address for the requested address is sent after another cycle. If the address which is stored in the address latch reserved for the requesting processor 102c is not on the same page as the current requested address, then the previous address is considered not valid, as shown by the dashed signal 600. If, however, the current requested address 602 is on the same page as the previous address 604', then the previous address is considered valid as shown by signal 608.

When the previous address is considered valid, then the address stored in the memory controller address latch reserved for the requesting processor 102c is combined with the cache line address of the current requested address 102'. The previous address stored in the memory controller address latch reserved for the requesting processor 102c is represented by 604". The resulting combination can be seen by the portion of the saved address 604'" combined with a cache line address of the current requested address 602'. Thereafter, the combined memory address can be utilized to fetch the requested data from memory, thereby reducing the request to memory address latency for the current requested address 602 to approximately two bus cycles.

A system and method for a high speed memory access forwarding mechanism has been disclosed. Software written according to the present invention is to be stored in some form of computer-readable medium, such as memory or CD-ROM, or transmitted over a network, and executed by a processor. The system and method according to the present invention can apply to any memory page size and cache line size. Additionally, page hits can occur anywhere in the page, without the need for the addresses being sequential. The additional signals, such as the previous address valid signals, do not affect normal bus operation despite the fact that the requested data is returned at least three cycles faster than in conventional methods. A further advantage of the system and method according to the present invention, is that the number of cycles saved increases when the address bus is busy and bus grants are delayed. The present invention can apply to any number of processors, including a single processor configuration. Further, the implementation of the present invention is simple and low risk.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for high speed memory address forwarding for a processing system, the processing system including at least one processor and at least one memory, the method comprising the steps of:
   (a) saving a first address for a first data request from the at least one processor;
   (b) providing a portion of a second address for a second data request from the at least one processor, the second address capable of being non-sequential with respect to the first address;
   (c) determining if the first and second addresses are located on a common page of the at least one a memory;
   (d) combining the portion of the second address with at least a portion of the first address to form a combined address if the first and second addresses are located on the common page and regardless of whether the second address is sequential or non-sequential with respect to the first address; and
   (e) requesting data from the combined address of the common page.

2. The method of claim 1, wherein the first address is saved in a latch reserved for the at least one processor.

3. The method of claim 1, wherein step (c) includes a substep (c1) of sending a signal indicating whether the first and second addresses are located on the common page.

4. The method of claim 1, wherein the portion of the second address is a cache line address of the second address.

5. The method of claim 1, wherein the at least a portion of the first address is a page address of the first address.

6. The method of claim 1, wherein an internal request to memory address latency is less than five cycles.

7. The method of claim 1, wherein an internal request to memory address latency is approximately two cycles.

8. A system for high speed memory address forwarding for a processor system, the system comprising:
   storage means with a plurality of addresses;
   processing means for providing a first address from the plurality of addresses and at least a portion of a second address from the plurality of addresses of the storage means, the second address capable of being non-sequential with respect to the first address;
   means for combining at least a portion of the first address with the at least a portion of the second address to form a combined address if the first address and the second address are located on a common page of the storage means and regardless of whether the second address is sequential or non-sequential with respect to the first address, the combining means being coupled with the processing means; and
   means for requesting data from the combined address, the requesting means being coupled with the storage means.

9. The system of claim 8, further comprising means for latching the first address, the latching means being reserved for the processing means, wherein the latching means being coupled to the processing means.

10. The system of claim 8, wherein the processing means further provides a signal indicating whether the first and second addresses are located on a common page of the storage means.

11. The system of claim 8, wherein the portion of the second address is a cache line address of the second address.

12. The system of claim 8, wherein the at least a portion of the first address is a page address of the first address.

13. The system of claim 8, wherein an internal request to memory address latency is less than five cycles.

14. The system of claim 8, wherein an internal request to memory address latency is approximately two cycles.

15. A computer readable medium containing program instructions for high speed memory address forwarding for a processing system, the processing system including at least one processor and at least one memory, the including instructions for:
   (a) saving a first address for a first data request from the at least one processor;
   (b) providing a portion of a second address for a second data request from the at least one processor, the second address capable of being non-sequential with respect to the first address;
   (c) determining if the first and second addresses are located on a common page of the at least one a memory;
   (d) combining the portion of the second address with at least a portion of the first address to form a combined address if the first and second addresses are located on the common page and regardless of whether the second address is sequential or non-sequential with respect to the first address; and
   (e) requesting data from the combined address of the common page.

16. The computer readable medium of claim 15, wherein an internal request to memory address latency is less than five cycles.

17. The computer readable medium of claim 15, wherein an internal request to memory address latency is approximately two cycles.

18. The computer readable medium of claim 15, wherein the portion of the second address is a cache line address of the second address.

19. The computer readable medium of claim 15, wherein the at least a portion of the first address is a page address of the first address.

* * * * *